United States Patent                                           [11] 3,620,769

[72] Inventor  Marvin A. Peterson
                Park Ridge, Ill.
[21] Appl. No. 824,263
[22] Filed     May 13, 1969
[45] Patented  Nov. 16, 1971
[73] Assignee  Beatrice Foods Co.
                Chicago, Ill.
                Continuation-in-part of application Ser. No.
                716,317, Mar. 27, 1968.

[54] MARSHMALLOW COMPOSITION
     9 Claims, No Drawings
[52] U.S. Cl. ........................................................ 99/134,
                                                              99/128
[51] Int. Cl. ....................................................... A23g 3/00
[50] Field of Search ............................................ 99/118,
                                                              134, 139

[56]                 References Cited
              UNITED STATES PATENTS
1,859,240   5/1932  Jordan ........................... 99/134

2,914,410  11/1959  Butler ............................. 99/139
3,278,314  10/1966  Colby et al. ..................... 99/134 X
3,366,494   1/1968  Bower et al. .................... 99/139 X
              OTHER REFERENCES
  Atlantic Gelatin Pamphlet, (Div. of Gen. Foods), publication received in Patent Office June 18, 1962, pp. 11–12.
  Nash, N. H. and Babayan, V. K., " Polyglycerol Esters - A New Development in the Field of Food Emulsifiers," The Baker's Digest, October, 1963, pp. 72–75.
  Heller's Guide for Ice-cream Makers, B. Heller & Co. (Chicago), 1918, pp. 55–58.

Primary Examiner—A. Louis Monacell
Assistant Examiner—J. M. Hunter
Attorney—Cushman, Darby & Cushman ABSTRACT: A humectant is added to a marshmallow composition containing a fat and polyglycerol higher fatty acid partial ester stabilizer in order to prevent migration of moisture from the marshmallow composition.

MARSHMALLOW COMPOSITION

This is a continuation-in-part of copending application Ser. No. 716,317, filed on Mar. 27, 1968 and entitled INCORPORATING FAT IN MARSHMALLOW.

The present invention relates to an improvement in the above-identified application, which improvement allows the marshmallow composition of that application to be used in mixing with a wide variety of other edible foods.

As disclosed in the above application, problems are encountered in incorporating aerating agents into warm marshmallow forming systems, and fats are normally not compatible with marshmallow systems. Since marshmallows normally contain gelatin or albumen, it is difficult to combine marshmallow, in a layered fashion, with fat-containing materials such as peanut butter.

However, it was found that by aerating a marshmallow mixture in the warm condition with a polyglycerol higher fatty acid partial ester as an emulsifier, the compatibility of a fat-containing material such as peanut butter could be greatly improved. A fat is employed as a carrier for the partial ester, and in turn the partial ester permits the fat to enter the marshmallow system to impart a richness not normally present in marshmallow.

The polyglycerol higher fatty acid partial ester can have more hydrophobic than hydrophilic groups, e.g. decaglycerol decastearate, but preferably it has more hydrophilic than hydrophobic groups. The preferred partial ester is decaglycerol tristearate. Other suitable partial esters are triglycerol monostearate, decaglycerol tripalmitate, hexaglycerol distearate, triglycerol monoshortening (triglycerol monoester of the acids of cottonseed oil), hexaglycerol monoshortening, decaglycerol trishortening, diglycerol monostearate, decaglycerol hexapalmitate, decaglycerol diarachinate, triglycerol monobehenate, decaglycerol trilignocerate, decaglycerol tetramyristate, decaglycerol triester of hydrogenated cottonseed oil acids.

While polyglycerol esters from diglycerol to tricontoglycerol (30 glycerol units) partial esters of fatty acid can be employed there are preferably used triglycerol to decaglycerol esters of higher fatty acids, e.g. containing 12 to 22 carbon atoms in the fatty acid.

Aeration of the marshmallow mix is carried out while the mix is warm. Suitable temperatures are between 90° to 150° F., preferably at not over 135° F. and most preferably at 100°–105° F. With liquid fats, however, temperatures as low as 70° F., i.e. room temperature can be employed. Hence, the term warm, as used above, means temperatures within the above ranges.

The fats which may be employed as carriers include both animal and vegetable fats which will solubilize the esters, e.g. butter, coconut oil, cottonseed oil, hydrogenated cottonseed oil, peanut oil, hydrogenated peanut oil, soybean oil, hydrogenated soybean oil, lard, safflower oil, corn oil, hydrogenated corn oil, olive oil, hydrogenated coconut oil, e.g. hydrogenated to a melting point of 92° F.

The marshmallow mixture itself can be any conventional marshmallow mixture. Such mixtures usually contain a sugar, e.g. sucrose with or without corn syrup, and a small amount of a thickener, e.g. gelatin, albumen or agar.

The marshmallow formulations which are suitable are set forth in examples A to F below where all parts are by weight. These formulations are, however, only representative and in no way restrictive of formulations that may be employed.

Example A

| | |
|---|---|
| Gelatin (250 Bloom) | 1.8 parts |
| Water | 22.0 parts |
| Sucrose | 45.72 parts |
| Corn syrup | 30.48 parts |

Example B

| | |
|---|---|
| Gelatin | 2.5 parts |
| Water | 7.25 parts |
| Corn Syrup (54 DE about 81.5% solids) | 37.5 parts |
| Dextrose | 10.0 parts |
| Sucrose | 22.5 parts |

Example C

| | |
|---|---|
| Dextrose (90% solids) | 300 lbs. |
| Amioca starch (88% solids) | 50 lbs. |
| Sucrose | 700 lbs. |
| Corn Syrup (54 DE about 81.5% solids) | 780 lbs. |
| Gelatin (90% solids) | 38 lbs. |
| Water | 22 gallons |

Example D

| | |
|---|---|
| Corn syrup (54 DE about 81.5% solids) | 1,080 parts |
| Amioca starch | 75 parts |
| Sucrose | 800 parts |
| Gelatin | 50 parts |
| Water | 200 parts |

Example E

| | |
|---|---|
| Gelatin | 2 tablespoons |
| Water | 1½ cup |
| Sucrose | 2 cups |

Example F

| | |
|---|---|
| Invert sugar | 68 parts |
| Sucrose | 3 parts |
| Water | 29 parts |
| Egg Albumen (dried) | 2 parts |

While there can be employed in the present invention high solids marshmallow formulations such as those containing 13 to 19 percent water as set forth in Doumak U.S. Pat. No. 2,847,311 (the disclosure of which is incorporated herein by reference), it is preferred that the marshmallow formulations contain more than 19 percent water and less than 27 percent water, since below 19 percent a danger of crystallization of the sugars occurs and above 27 percent the mixture is subject to mold formation (unless a preservative is added) and starts to become a fluid.

Hence, the marshmallow mixture contains on a solids basis: sugars, e.g. sucrose, dextrose, corn syrup, 84 to 98 percent; a thickener, e.g. gelatin, albumen, agar, 0.5 to 10 percent; polyglycerol partial fatty acid ester 0.33 to 6 percent; fat 0.25 to 14 percent; and, in addition to the solids content, from 19 percent to 27 percent water.

Also, the composition may have other additives such as coloring agents, flavoring agents, e.g. vanilla, chocolate, etc. and salt to taste.

The general procedure for making marshmallows according to the invention is to make a solution in water of the sugars, e.g. sucrose, corn syrup; the thickener, e.g. gelatin, and if desired flavoring and other additives as well as salt if desired. The mixture is heated until it dissolves. Heating can be from 120° F. to the boiling point and is preferably at least 150° F. Then the melted fat and emulsifier are added. Sufficient time is allowed for the polyglycerol partial ester emulsifier to hydrate, e.g. up to 5 hours, especially from 30 seconds to 2 hours, the mixture is cooled to a warm temperature, e.g. to 150° F. or below, preferably 90° to 135° F., and then aerated in a closed system with a nontoxic inert gas, e.g. nitrogen or compressed air until the desired specific gravity is reached. The preferred specific gravity is 0.5.

An example of such a marshmallow is given below.

EXAMPLE I

| | |
|---|---|
| Sucrose | 21.10 parts |
| High maltose corn syrup | 56.80 parts |
| Gelatin (250 Bloom) | 1.0 parts |
| Water | 15.35 parts |

The sucrose, corn syrup and water were heated to 175° F. until the sugar and corn syrup dissolved. The resulting solution had 75 percent solids (the balance of the water in addition to that added directly came primarily from the corn syrups). Then there was added 0.6 part of decaglycerol tristearate in 5.15 parts of a fat which consisted of 5 parts hard butter (Kaomel) and 0.15 parts of stearin. The decaglycerol tristearate was allowed to hydrate and the mixture cooled to 100° F. and aerated with compressed air until a specific gravity of 0.5 was reached. The mixture was then cooled to room temperature. It had a richness due to the fat not normally present in marshmallow.

As indicated in the above-mentioned application, the marshmallow composition is particularly suitable for use with peanut butter, e.g. in ratio of 25:75 to 95:5 of peanut butter to marshmallow, since the migration of the water from the marshmallow into the peanut butter is reduced due to the use of the emulsifier and fat.

However, it has now been found that when the marshmallow composition is mixed with a food stuff which has a significantly different water content, as compared with the water content of the marshmallow, water will migrate from the marshmallow to the other food stuff, when the other food stuff does not have a relatively high fat or oil content such as does peanut butter. The loss of water from the marshmallow impairs the texture and flavor thereof and if a considerable amount of water is lost (as during long storage), sugars in the marshmallow will crystallize and the marshmallow will therefore not have the desired taste or texture and become dry. Also, it has been found that even with peanut butter, some migration of water from the marshmallow will take place when the marshmallow and peanut butter are mixed in such a way that considerable intermixing of the marshmallow and peanut butter is accomplished. Hence, the marshmallow will tend to dry.

Accordingly, it is an object of the present improvement to prevent migration of water from the marshmallow when the marshmallow is mixed with other food stuffs. It is a further object to prevent substantially drying of the marshmallow in the marshmallow and peanut butter mixture of the aforementioned application, even when considerable intermingling of the marshmallow and peanut butter is accomplished.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the above objects can be obtained by incorporating a humectant in the marshmallow composition. The humectant prevents substantial migration of water from the marshmallow to other food stuffs of less water content and substantially prevents water migration from the marshmallow to peanut butter, even with a considerable amount of intermixing thereof.

The particular humectant is not critical in chemical composition and may be any humectant desired so long as the humectant:

1. is compatible with the marshmallow composition (will not disrupt the structure of the aerated composition), and is especially compatible with the sugars thereof;
2. has a boiling temperature above the cooking temperature of the marshmallow composition;
3. is soluble in the marshmallow composition; and
4. is, of course, edible.

Among the humectants suitable for the invention are the nontoxic glycerols of up to 18 carbon atoms, e.g. propylene glycerol, glycerol, sorbitol, mesoinositol, mannitol. The humectant may also be an edible tree or plant gum, e.g. gum arabic, karaya gum, tragacanth gum, agar-agar, algin and alginates, carageenin and furcelleran. Also the humectant may be polysorbates, pectins, and carboxymethyl cellulose. The humectants may be added in a dry form or as a solution, e.g. a water solution, as desired. The humectants may be added to the composition at any time prior to aeration of the marshmallow mixture, e.g. in the initial formulation, just prior to cooking or after cooking. The particular amount of humectant used is not narrowly critical and depends mostly on the relative water content of the marshmallow opposite the water content of the other food stuff. Hence, if the water content of the marshmallow is not greatly higher than the other food stuff, e.g. 23 percent versus 17 percent, a relatively small amount of humectant will be sufficient. Conversely, if the water contents are greatly different, e.g. 23 percent versus 8 percent or less, a relatively large amount of humectant will be required. Hence, as little as one-half percent and as great as 25 percent by weight of humectant, based on the total solids of the marshmallow composition, may be used, especially from 1 percent to 10 percent. Stated another way, the ratio by weight of the humectant to the total water content of the marshmallow composition may be as high as 1:1 or as low as 1:7, especially 1:2 to 1:6, e.g. 1:4. Obviously, the relative effectiveness of the particular humectant per unit weight to slow down the migration of water must be taken into account. With any formulation a sufficient amount of humectant must be employed, i.e. to prevent a substantial migration of water from the marshmallow. An optimum amount of any particular humectant can simply and easily be determined by a few test samples. Hence, for example, with marshmallow (approximately 23 percent water content) and a thick chocolate syrup (water content approximately 12 percent), test samples with various amounts (e.g. 1, 5, 8 and 10 percent) of humectants (e.g. sorbitol) may be prepared in layered form (e.g. one layer of marshmallow and one layer of chocolate syrup). After 60 days of storage at room temperature, the water content of the marshmallow is determined by heating, e.g. at 110° F., the marshmallow to dryness. The sample that has retained substantially all of the water, e.g. 21 percent water retained, is the lowest amount of the humectant that should be used for optimum results. At any rate, the loss of water from the marshmallow should not be substantial, i.e. should not be more than about one-third, preferably not more than one-fifth, and especially not more than about one-tenth of the water initially present in the marshmallow, or should not result in a marshmallow composition containing less than 18 percent water.

As noted above, the humectant can be added as a water solution, but the above discussed water contents should be observed and the water used to make up the humectant solution should be included in those water contents, for optimum water content levels. Also, as noted above, flavoring may be added to the marshmallow composition, e.g. vanilla (natural or imitation), fruit and berry flavors in an oil or water solution, chocolate, etc., but any water associated with the flavors should also be taken into account to conform the total water content of the composition with the above.

Any edible food stuff may be used with the marshmallow composition such as fruits, e.g. oranges, apples, pears; sweet potatoes; ice cream; and syrups, e.g. chocolate, strawberry, butterscotch. The edible food may be layered, swirled, tossed, etc., with the marshmallow, as desired.

The following examples will illustrate the present invention. In this specification, unless otherwise noted, all percentages, ratios and parts are by weight.

EXAMPLE II

A marshmallow composition was prepared by the procedure of example I except that the composition had the following ingredients:

| | |
|---|---|
| Glycerol | 6.4% |
| Corn syrup | 51.9% |
| Cane sugar | 19.6% |
| Kaomel (hard butter) | 5.5% |
| Gelatin (250 Bloom) | 1.4% |
| Decaglycerol decastearate | 0.9% |
| Triglycerol monostearate | 0.3% |
| Sodium alginate | 0.28% |
| Salt | 0.9% |
| Cream of tartar and vanilla (180:1 ratio) | 1.9% |
| Water | Balance to 100% |

The aerated marshmallow composition was layered with chocolate syrup, butterscotch syrup, chocolate ice cream and peanut butter, respectively, in separate samples. After 60 days of storage, none of the samples showed a significant migration of water from the marshmallow.

EXAMPLE III

A marshmallow composition was prepared by the procedure of example I except that the composition had the following ingredients:

| | |
|---|---|
| Glycerol | 1.0% |
| 70% water solution sorbitol | 10.0% |
| Corn syrup | 56.3% |
| Cane sugar | 14.3% |
| Kaomel (hard butter) | 2.5% |
| Gelatin (250 Bloom) | 0.7% |
| Diglycerol monostearate | 0.8% |
| Decaglycerol tristearate | 0.7% |
| Cream of tartar and imitation marshmallow flavor (coconut base) in a 180:1 ratio | 1.9% |

The aerated composition was tested as in example II with the same results.

EXAMPLE IV

The procedure of example I was repeated with the composition of example II, except that, serially, the humectant was propylene glycol, sorbitol, mannitol and carboxymethyl cellulose. Each composition when tested as in example II showed no substantial migration of water.

What is claimed is:

1. In the combination of peanut butter in juxtaposition to a marshmallow composition which includes a fat and a polyglycerol higher fatty acid partial ester the improvement wherein the marshmallow composition also contains an edible humectant in an amount sufficient to prevent migration of water from the marshmallow to the peanut butter.

2. A marshmallow composition according to claim 1 wherein the polyglycerol ester is an ester of a saturated fatty acid, and the humectant is soluble in the marshmallow composition and has a boiling temperature above the cooking temperature of the marshmallow composition.

3. A marshmallow composition according to claim 2 wherein the fat is 1 to 14 percent of the total marshmallow solids, the saturated fatty acid ester is an ester of a fatty acid having 16 to 18 carbon atoms and is present in an amount of up to 6 percent by weight of the total solids and the humectant is present in an amount up to 25 percent by weight of the total solids.

4. A marshmallow composition according to claim 3 wherein the fatty acid ester is a tri- to deca-glycerol stearate having more free hydroxyl groups than esterified hydroxyl groups and the ratio of humectant to total water in the composition is about 1:1 to 1:7.

5. A product according to claim 3, wherein the fat is 1 to 10 percent of the total marshmallow composition and the ester is a palmitate or stearate and is present in an amount of 0.25 to 2 percent of the total marshmallow composition and the ratio of humectant to total water in the composition is 1:1 to 1:7.

6. A marshmallow composition according to claim 1 wherein the humectant is a nontoxic glycol of up to 18 carbon atoms.

7. A marshmallow composition according to claim 1 wherein the humectant is an edible tree or plant gum.

8. A marshmallow composition according to claim 1 wherein the humectant is a polysorbate, pectin or carboxymethyl cellulose.

9. A product according to claim 1 containing about 21 parts sucrose, about 57 parts corn syrups, about one part gelatin, about 15 parts water, about 0.6 part decaglycerol tristearate, about five parts fat and about 3 percent sodium alginate.

* * * * *